INVENTORS
MAURITS TEN BOSCH
PAUL LANG
BY
ATTORNEY

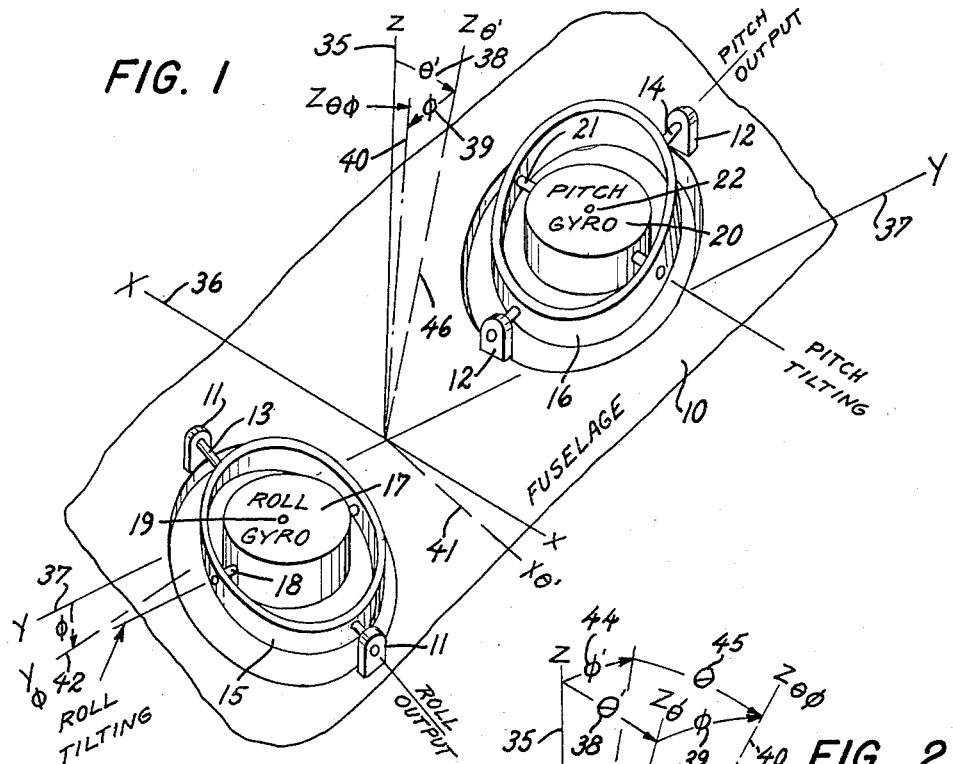
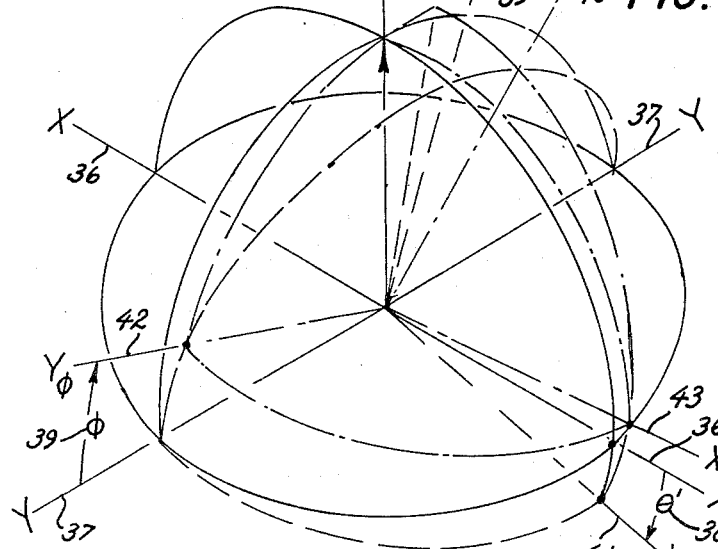

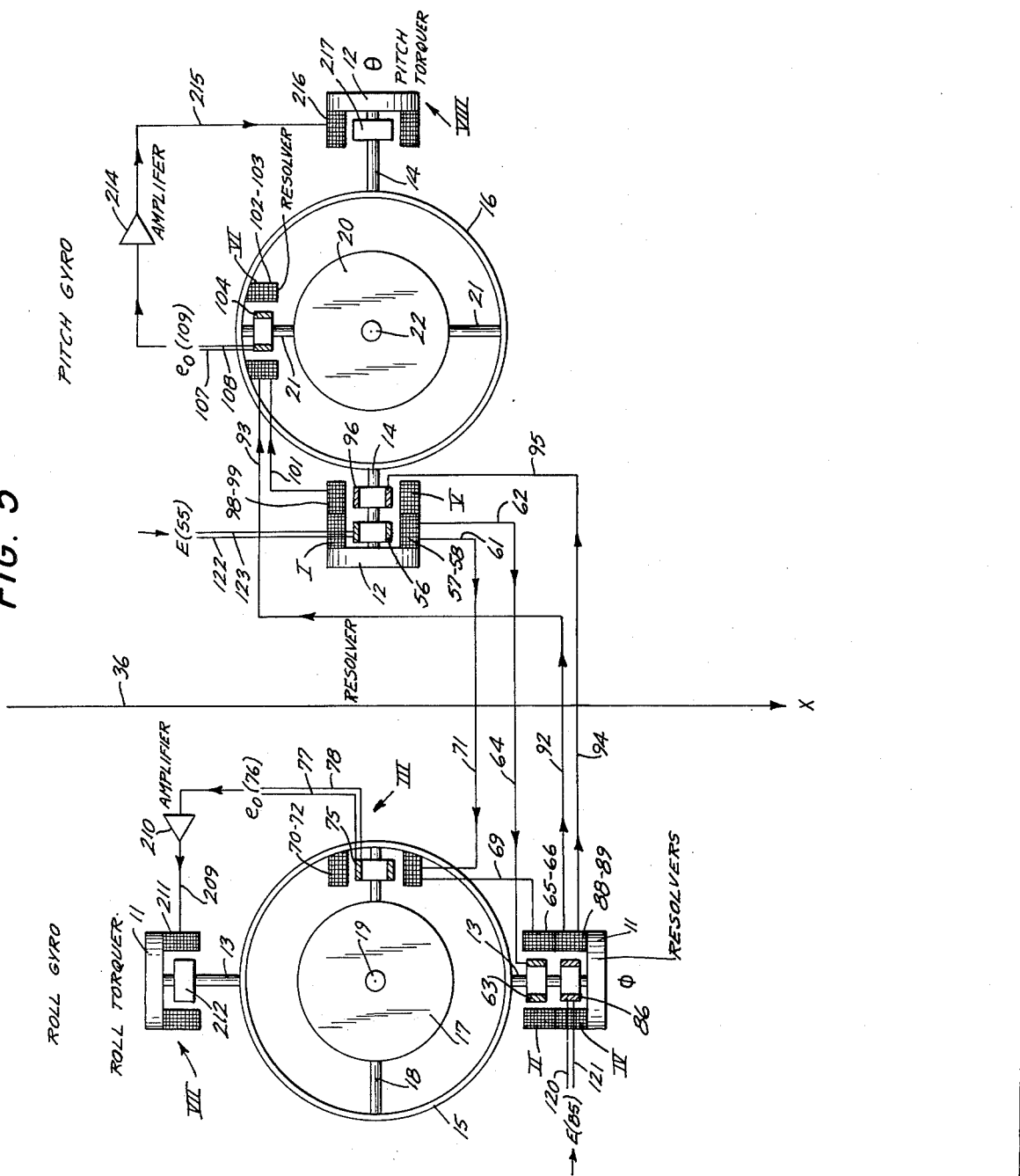

United States Patent Office 3,071,977
Patented Jan. 8, 1963

3,071,977
GYROSCOPE SYSTEM
Maurits Ten Bosch, White Plains, and Paul Lang, Katonah, N.Y., assignors to M. Ten Bosch, Inc., Pleasantville, N.Y., a corporation of New York
Filed Feb. 8, 1960, Ser. No. 7,447
11 Claims. (Cl. 74—5.34)

The present invention relates to a gyroscope system, and it particularly relates to a cross-coupling system for two single axis gyroscope systems.

It is among the objects of the present invention to provide a cross-coupling system for two single axis gyroscopes provided with a simple, reliable and effective cross-coupling system.

Another object is to provide a cross-coupling system for associated gyroscopes in which the spin axes will be maintained in parallelism to each other.

A still further object of the present invention is to provide a simple cross-coupling gyroscope arrangement in which by means of electrical connections, it will be possible to maintain the spin axes of both gyroscopes in parallelism to each other throughout operation.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, two individual single axis gyroscopes will each have one free or tilting axis and one servo controlled axis.

These two gyroscopes by cross-coupling system are then regulated so as to simulate a single free gyroscope in behavior.

A single platform is employed, and the use of two gyroscopes will provide a much more adaptable arrangement than a single free gyroscope, and it will also provide a more satisfactory arrangement over a doubly servo-controlled platform mounting the two gyroscopes.

The two servo controlled output axes in the preferred system of the present invention will both be available and can be used directly to drive the various outputs.

In connection with aircraft, both output axes may be maintained on the fuselage, and the angles of the output axes and the angles of the axis motions are measured directly with respect to the fuselage and can then be used for auto pilot servo control without coordinate conversion.

The overall volume and weight of the two individual gyroscopes will be less than a comparable rotor platform gyroscope, and this will reduce the handling and installation problems.

In the preferred arrangement particularly where the system is applied to a moving vehicle such as aircraft, one gyroscope will serve as a roll gyroscope and the other will serve as a pitch gyroscope respectively giving a roll output signal and a pitch output signal.

The roll output signal and the pitch output signal will be derived for axes which are at right angles to each other.

On the other hand, the roll gyroscope will have a roll tilting axes at right angles to the roll output axis, while the pitch gyroscope will have a pitch tilting axis at right angles to the pitch output axis with the roll tilting axis, and the pitch tilting axis being at right angles to each other.

An important feature of the present invention resides in the fact that the spin axes of both gyroscopes are maintained parallel to each other and to the vertical by means of an electrical cross-coupling system and an erection system on each gyroscope.

In such a system, assuming level flight, the pitch output axis and the roll gyroscope tilting axis are maintained parallel to a horizontal axis at right angles to the vertical spin axis while the roll output axis and the pitch tilting axis is also maintained at right angles to the vertical axis but parallel to a horizontal axis, and at the same time also perpendicular or at right angles to the aforementioned pitch output and roll gyroscope tilting axis.

The angle pickoff devices are positioned on each axis, and these will indicate the angles resulting from movement of the pitch output, pitch tilting, roll output and roll tilting axes.

Electrical resolvers may be placed on each of the axis to compute the proper relationship and electrical information which is required.

Fixed voltages are applied to one resolver on each output axis which in turn will be resolved into components one of which will be further resolved on the other output axis and then applied to the resolvers on the respective tilting axes.

The rotors of the resolvers on the tilting axes will be so coordinated that no voltages will appear, and there will be no error signals across the rotor coils when the angles of the tilting axes are correct.

When there are error voltages, however, appearing on the rotor coils, these are actuated by the torquers about the output axes to maintain the parallelism.

In this manner, both gyroscope spin axes will be kept in parallelism to each other and each gyroscope will be erected to a parallel vertical spin axis by electrical signals from the other gyroscope.

The roll and output signals are tied directly to the carrier vertical without the necessity of going through coordinate transformation as is frequently necessary with a platform system and with two separated torqued gyroscopes.

The system of the present application is particularly used in aircraft and other moving vehicles to stabilize automatic pilot and other flight controls, and it avoids mounting the gyroscopes in combination with a two rotor platform control.

Furthermore, the output axes may be directly coupled to the vehicle or aircraft.

| Axis | Position | Angle |
|---|---|---|
| Pitch output | $Y_\phi$ | $\theta$ |
| Pitch tilting | $X_\phi$ | $\phi'$ |
| Roll output | $X_{\theta'}$ | $\phi$ |
| Roll tilting | $Y$ | $\theta'$ |

The measured angles bear the following spherical trigonometric relations to each other $$\tan \phi' = \tan \phi \cos \theta$$

and $$\tan \theta' = \tan \theta \cos \phi$$

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a diagrammatic illustration showing the two individual single axis gyroscopes mounted with or on the fuselage of an aircraft.

FIG. 2 is a diagrammatic layout showing the requirements of a cross-coupling system used for coordinating the gyroscopes of FIG. 1 and maintaining the spin axes in parallelism throughout operation.

FIG. 5 is a diagrammatic layout showing the application of the resolvers and torquers to the roll and pitch gyroscopes.

Figure 3:
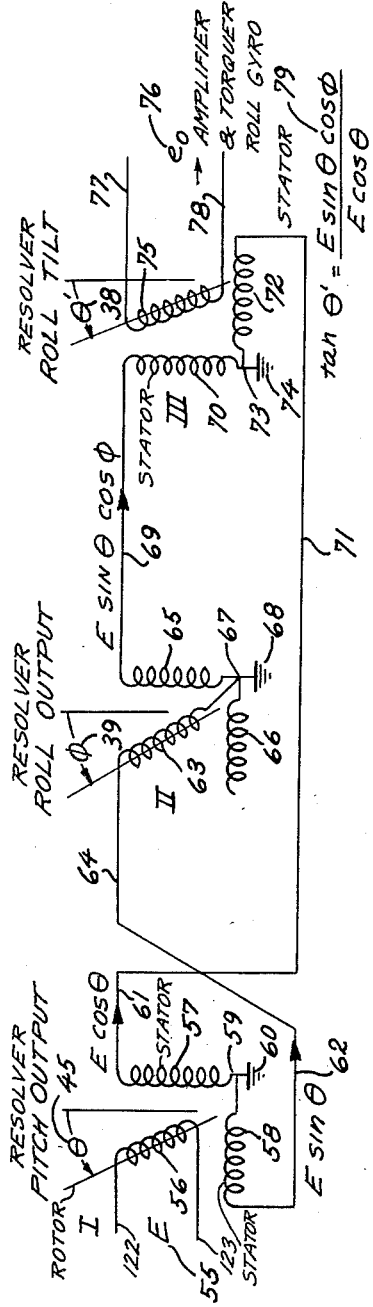
FIG. 3 is a diagrammatic layout of the electrical resolver arrangement as applied to the pitch output axis and as carried to the roll tilting axis showing the manner in which the trigonometric relationships are computed.

Referring to FIG. 1, there is shown a fuselage 10 which carries the mounting members 11 and 12 for the roll output axis 13 and the pitch output axis 14 respectively.

It will be noted that the roll output axis and the pitch output axis are mounted parallel to the fuselage, but at right angles to each other.

These axes will carry respectively the roll gimbal 15 and the pitch gimbal 16.

The roll gyroscope housing 17 will be carried by the roll tilting axis on the roll gimbal 15, and it will have a vertical spin axis diagrammatically indicated at position 19.

The pitch gyroscope will have a housing 20 carried by the pitch tilting axis 21 on the pitch gimbal 16, and it will have a vertical spin axis indicated diagrammatically at position 22.

Now referring to FIGS. 1 and 2, to determine the requirements of a cross-coupling system, the Z-axis 35 may be regarded as the gravitational vertical, and the plane carrying the longitudinal perpendicular axis and the plane carrying the longitudinal perpendicular X-axis 36 and Y-axis 37 will be horizontal and perpendicular to the Z-axis 35.

Assuming level flight, the pitch output axis 14 and the roll gyroscope tilting axis 18, will be maintained in parallelism to the Y-axis 37.

At the same time the roll output axis 13 and the pitch tilting axis 21 will be maintained parallel to the X-axis 36.

It is, of course, assumed that the spin axes diagrammatically indicated at positions 19 and 22 will be maintained parallel to the Z-axis 35.

Now it may be assumed that the aircraft will pitch through an angle 38 and will roll around the displaced roll output axis through an angle 39.

With such displacement, the aircraft vertical will have been displaced to the new Z-axis 40.

The axis of each of the gyroscopes will now be parallel to the positions indicated in the table below, and the angle pickoff device (not shown) placed on each axis will indicate the angles shown in the table.

The position of the displaced X axis resulting from the angular displacement 38 is indicated at 41 in FIGS. 1 and 2.

The position of the displaced Y axis due to angle 39 is indicated at 42 in FIGS. 1 and 2.

The displacement of the X axis due to the angle 39 is indicated at 43 in FIG. 2.

The corresponding angle of displacement of the pitch tilting axis is indicated at 44 in FIG. 2.

The corresponding angle of displacement of the pitch output axis is indicated by the angle 45 in FIG. 2.

The displaced Z axis due to the angle 38 is indicated at 46 in FIG. 1.

Figure 4:
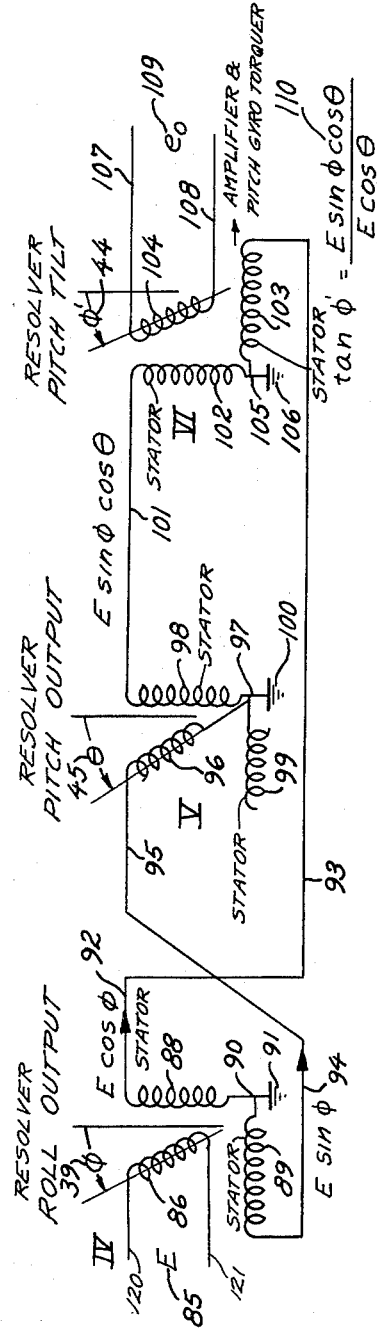
FIG. 4 is a diagrammatic layout showing the manner in which the electrical resolvers are positioned upon the roll output and pitch output axes to compute the trigonometric relations which are then applied to the pitch tilt axis of the other gyroscopes.

Electrical resolvers as shown in FIGS. 3 and 4 to compute the trigonometric relationships may be placed upon the pitch output axis and the roll output axis.

Referring to FIGS. 3 and 4, the pitch output axis (see position I) may receive a fixed voltage 55 applied to the coil 56 which may be resolved into components by the right angle coils 57 and 58.

The angle 45 will vary with the displacement of the pitch output axis and will change the resolution by the coils 57 and 58 which are grounded at their junction point 59 by the ground 60.

The signals transmitted through the line 61 will be a function of the fixed voltage 55 multiplied by the cosine of the angle 45.

At the same time the signal transmitted through the line 62 will be the fixed voltage 55 multipled by the sine of the angle 45.

These electrical signals are then further resolved at position II in FIG. 3 at the roll output axis.

The roll output axis is provided with movable coil 63 connected to the line 64 which in turn is connected to receive the sine signal.

The angle of the coil 63 will vary with the change of the angle 39 which in turn varies with the change in position of the roll output axis.

The information transmitted to the coil 63 will be resolved by the coils 65 and 66 which have a junction at 67 connected to the ground 68.

This will result in a signal being transmitted through the line 69 which will be the voltage 55 multiplied by the sine of the angle 45 and by the cosine of the angle 39.

The signals are now transmitted to the roll tilting axis resolver at position III in FIG. 3.

The signal passing through the line 69 will be transmitted to the coil 70 while the signal passing through the line 61 and 71 consisting of the voltage 55 multiplied by the cosine of the angle 45 will be transmitted to the coil 72.

The coils 70 and 72 will meet at the junction 73 and will be connected to the ground at 74.

The coils 70 and 72 are coupled with the movable coil 75 which will have a displacement angle 38.

The resultant signals will be the error voltage or error signal 76 which will be transmitted to the torquer through the line 77 and 78 to actuate the torquer about the output axis.

In FIG. 3, the trigonometric relationship is indicated by the formula 79, which is equivalent to the tangent of angle 38.

In the layout of FIG. 4, the fixed voltage 85 at position IV will be transmitted to the movable coil 86 of the roll output resolver having the angle of displacement 39.

The electrical signals will then be resolved by the coils 88 and 89 having a junction connection at 90 to the ground 91.

The signal transmitted through the line 92 and 93 to the pitch tilting resolver position VI will consist of the voltage 85 multiplied by the cosine of the angle 39.

The signal from the coil 89 will pass through the line 94 and 95 to the pitch output resolver position V, and it will consist of the voltage 85 multiplied by the sine of the angle 39.

The movable coil 96 at position V will be joined at 97 with the two resolver coils 98 and 99.

The junction is connected to the ground 100.

The angle of the coil 96 will be the angle 45 corresponding to the displacement of the pitch output axis.

The signal from the coil 98 which will be transmitted through the line 101 is the voltage 85 multiplied by the sine of the angle 39 and the cosine of the angle 45 which is transmitted to the coil 102 of the pitch tilting resolver also having a fixed coil 103 and a movable coil 104.

The coils 102 and 103 have a junction connection 105 and a ground 106.

The displacement of the coil 104 will be the displacement of the angle 44 resulting from the movement of the roll tilting axis and the coil 104 will transmit a signal 109 through the lines 107 and 108 in torque about the output axis.

The trigonometric relationship is indicated by the equation 110 in FIG. 4.

It is thus apparent that the applicants have provided a simple, cross-coupling system for two single axis gyroscopes each having one free or tilting axis and each having one servo controlled axis.

Referring to FIG. 5, there is diagrammatically shown the manner in which the roll gyroscope and pitch gyroscope are provided with the roll and pitch torquers as well as the various resolvers shown in the circuit diagrammatically of FIGS. 3 and 4.

Extending centrally through FIG. 5 is the fore and aft X axis 36.

To the left of the X axis 36 is indicated the roll gyroscope 17 having the roll tilting axis 18 on which is diagrammatically mounted on the right the roll tilting axis resolver III.

This roll tilting axis resolver has an outside winding 70—72, and a movable coil 75 which has leads at 77 and 78 to supply the signal through the amplifier 210 to the winding 211 of the roll torquer VII.

The roll torquer actuates the rotor 212 on the shaft 13 to maintain the axis 19 of the gyroscope 17 in vertical position.

The shaft 13 also carries the resolvers II and IV.

The resolver II has the fixed coils, 65—66 and the movable coil 63.

The resolver IV has the fixed coils, 88—89 and the movable coil 86.

The movable coil will receive a voltage E designated at 85 in FIGS. 4 and 5, which is transmitted through the leads 120 and 121.

The fixed coils of the resolvers II and III are connected by the lead 69, and the fixed coils 88 and 89 of the resolver IV are connected by the leads 92 and 94 respectively to the resolver VI and to the resolver V in the pitch gyroscope at the right of FIG. 5.

The movable coil 63 of the resolver II has a connection 64 to the resolver I of the pitch gyroscope at the right of FIG. 5.

The fixed coil 72 of the resolver III is also provided with a lead or connection 71 to the fixed coil 58 of the pitch gyroscope.

Referring particularly to the pitch gyroscope at the right of FIG. 5, the gyroscope housing 20 has a vertical axis 22, and it is connected by the pitch tilting shaft 21 to the pitch gimbal 16.

On this shaft is located the resolver VI having a movable coil 104 which is connected by the leads 107 and 108 to supply the signal $e_0$ indicated at 109 to the amplifier 214 which in turn transmits it by the lead 215 to the winding 216 of the pitch torquer VIII.

The pitch torquer VIII has a central member 217 mounted on the pitch output shaft 14 which connects the mounting member 12 to the pitch gimbal 16.

The signal transmitted through the lines 107 and 108 and through the amplifier 214 and the line 215 will maintain the axis 22 of the gyroscope 20 in vertical position.

Referring particularly to resolvers I and V, which are also mounted upon the shaft 14, the fixed coils 57 and 58 of the resolver I connects at 64 to the movable coil 63 of the roll output resolver II and 71 to the fixed coil 57 of the roll tilt resolver III.

The movable coil 56 of the resolver I has the connections 122 and 123 through which it receives a voltage E indicated at 55.

The fixed coil 98 of the pitch output resolver V is connected by the lead 101 to the fixed coil 102 of the pitch tilt resolver VI.

The movable coil 96 of the pitch output resolver is connected by the lead or connection 94 and 95 to the fixed coil 89 of the roll output resolver IV.

In this manner, the cross coupled single axis gyroscopes will simulate a normal free gyroscope in behavior, and the overall volume in weight of the two individual gyroscopes will be less than a comparison two rotor platform gyroscope, and hence reduce handling and installation problems.

These two cross-coupled gyroscopes will simulate a normal free gyroscope in behavior and at the same time they will provide two servo controlled output axes and, therefore, can be used directly to drive various outputs.

Since both output axes are mounted on the fuselage, the angles of the output axis motions are measured directly with respect to the fuselage and can be used for auto pilot servo control without coordinate conversion.

As many changes could be made in the above gyroscope system and many widely different embodiments of this invention could be made without departing from the scope of the claims, it is intended that all matter contained in the above description shall be interpreted as illustrative and not in a limiting sense.

By reference to FIGS. 3 and 4, it will be noted that in FIG. 3 there are three resolvers in series, namely, the pitch output resolver, the roll output resolver and the roll tilt resolver and in FIG. 4, there are three resolvers, namely, the roll output resolver, the pitch output resolver and the pitch tilt resolver. This constitutes six resolvers in all.

In FIG. 5, two of these resolvers are shown at the lower left hand side at II and IV and two resolvers are shown in the middle of FIG. 5 at I and V. The other resolvers are indicated at III and at VI.

The torquers are shown at VII and VIII.

Having now particularly described and ascertained the nature of the invention, and in what manner the same is to be performed, what is claimed is:

1. An electrical cross-coupling system for two single axis gyroscopes to maintain their spin axes in parallel vertical relationship, one serving as a pitch gyroscope and one serving as a roll gyroscope, each having a free tilting axis and a servo controlled output axis, each axis being provided with a resolver to create error signals to provide pitch tilting axis and pitch output axis resolvers and roll tilting axis and roll output axis resolvers, and torquers on the output axes actuated by the error signals from said resolvers.

2. An electrical cross-coupling system for two single axis gyroscopes to maintain their spin axes in parallel vertical relationship, one serving as a pitch gyroscope and one serving as a roll gyroscope, each having a free tilting axis and a servo controlled output axis, each axis being provided with a resolver to create error signals to provide pitch tilting axis and pitch output axis resolvers and roll tilting axis and roll output axis resolvers, and torquers on the output axes actuated by the error signals from said resolvers, and means to apply fixed voltages to the resolvers on the pitch output and roll output axes.

3. An electrical cross-coupling system for two single axis gyroscopes to maintain their spin axes in parallel vertical relationship, one serving as a pitch gyroscope and one serving as a roll gyroscope, each having a free tilting axis and a servo controlled output axis, each axis being provided with a resolver to create error signals to provide pitch tilting axis and pitch output axis resolvers and roll tilting axis and roll output axis resolvers, and torquers on the output axes actuated by the error signals from said resolvers, said pitch output resolver and said roll output resolver being in series with said tilting axis resolver to transmit a restoration signal to a torquer on the opposite output axis.

4. An electrical cross-coupling system for two single axis gyroscopes to maintain their spin axes in parallel vertical relationship, one serving as a pitch gyroscope and one serving as a roll gyroscope, each having a free tilting axis and a servo controlled output axis, each axis being provided with a resolver to create error signals to provide pitch tilting axis and pitch output axis resolvers and roll tilting axis and roll output axis resolvers, and torquers on the output axes actuated by the error signals from said resolvers, there being three resolvers arranged in series for each output axis, the pitch output resolver being in series with the roll output resolver and in series with the roll tilt resolver and the roll output resolver being in series with the pitch output resolver and the pitch tilt resolver.

5. An electrical cross-coupling system for two single axis gyroscopes to maintain their spin axes in parallel vertical relationship, one serving as a pitch gyroscope and one serving as a roll gyroscope, each having a free tilting axis and a servo controlled output axis, each axis being provided with a resolver to create error signals to provide pitch tilting axis and pitch output axis resolvers and roll tilting axis and roll output axis resolvers, and torquers on the output axes actuated by the error signals from said resolvers to provide a pitch output axis torquer and a roll output axis torquer, the resolvers on the roll tilting axis and on the roll output axis being connected with the resolvers on the pitch tilting axis and the pitch output axis.

6. The system of claim 5, said resolvers and said torquers each being provided with a rotor and a fixed field and the fields of the torquers being in series with the rotors of the output axis resolvers.

7. The system of claim 5, there being one resolver on each tilting axis and two resolvers on each output axis.

8. The system of claim 5, each output axis being provided with two resolvers having rotors and fixed fields, outside voltage connection to one of the rotors to one of said resolvers on said output axes and connections from the other rotor to the field of a resolver on the opposite output axis.

9. In a cross coupling system for two individual single axis gyroscopes, simulating a single free gyroscope in operation each of which is provided with one free tilt axis and one servo controlled axis, a vertical spin axis roll gyroscope, a vertical spin axis pitch gyroscope, roll tilt and roll output axes on the roll gyroscope at right angles to each other, pitch tilt and pitch output axes on the pitch gyroscope at right angles to each other, means to maintain the vertical axes of the roll and pitch gyroscopes parallel to each other and to maintain the roll and pitch tilt and output axes in the same plane perpendicular to the vertical spin axes including means on the roll and pitch tilt and output axes to produce signals to indicate movement of said roll and pitch tilt and output axes and means on the roll and pitch output axes to hold said axes in said desired position.

10. The system of claim 9, each output axis being provided with one torquer and two resolvers and each tilt axis being provided with one resolver.

11. The system of claim 9, said first mentioned means including resolvers on each of said roll and pitch axes and said last mentioned means including torquers on the roll and pitch output axes.

References Cited in the file of this patent
UNITED STATES PATENTS
1,465,532    Sundhauseen _____ Aug. 21, 1923
FOREIGN PATENTS
200,496    Australia _____ Dec. 9, 1955